(12) United States Patent
Nilsen et al.

(10) Patent No.: US 6,908,272 B2
(45) Date of Patent: Jun. 21, 2005

(54) THREADED FASTENER NUT WITH ANTI-CROSS THREADING RADIUSED FEATURES AND TACTILE FEEDBACK FEATURES

(75) Inventors: Martin J. Nilsen, Hampshire, IL (US); Michael E. Ward, Geneva, IL (US)

(73) Assignee: Illinois Tool Works Inc., Glenview, IL (US)

( * ) Notice: Subject to any disclaimer, the term of this patent is extended or adjusted under 35 U.S.C. 154(b) by 3 days.

(21) Appl. No.: 10/657,556

(22) Filed: Sep. 8, 2003

(65) Prior Publication Data

US 2004/0109740 A1 Jun. 10, 2004

Related U.S. Application Data

(63) Continuation-in-part of application No. 09/967,159, filed on Sep. 28, 2001, now Pat. No. 6,702,536.

(51) Int. Cl.$^7$ .............................................. F16B 37/00
(52) U.S. Cl. ...................... 411/427; 411/171; 411/187
(58) Field of Search ................. 411/386, 427, 411/436, 187, 188, 171

(56) References Cited

U.S. PATENT DOCUMENTS

| | | | |
|---|---|---|---|
| 447,775 A | | 3/1891 | Higbee |
| 844,750 A | * | 2/1907 | Rieschick .................. 411/188 |
| 1,208,997 A | * | 12/1916 | McGuigan .................. 411/188 |
| 2,040,383 A | | 5/1936 | Jasper |
| 2,374,690 A | | 5/1945 | Laue |
| 2,460,721 A | * | 2/1949 | Thompson .................. 72/333 |
| 2,595,830 A | | 5/1952 | Demboske |
| 2,983,180 A | | 5/1961 | Sygnator |
| 3,006,003 A | | 10/1961 | Johnson, Jr. |
| 3,101,210 A | | 8/1963 | Johnson |
| 3,933,074 A | | 1/1976 | Witte et al. |
| 4,469,465 A | | 9/1984 | Andrus |
| 4,750,851 A | | 6/1988 | Thomey |
| 4,790,208 A | * | 12/1988 | Johnson ....................... 74/548 |
| 4,907,930 A | | 3/1990 | Peterson |
| 4,915,560 A | | 4/1990 | Peterson et al. |
| 5,064,327 A | | 11/1991 | Hughes |
| 5,244,327 A | | 9/1993 | Whitesell |
| 5,419,667 A | | 5/1995 | Avgoustis |
| 5,618,144 A | | 4/1997 | Leistner |
| 5,704,749 A | | 1/1998 | Landgrebe |
| 5,791,849 A | | 8/1998 | Goodwin et al. |
| 5,997,231 A | | 12/1999 | Goodwin et al. |
| 6,062,786 A | | 5/2000 | Garver et al. |
| 6,328,515 B1 | | 12/2001 | Donovan |
| 6,439,818 B1 | | 8/2002 | Nagayama |

* cited by examiner

Primary Examiner—William L. Miller
(74) Attorney, Agent, or Firm—Mark W. Croll; Paul F. Donovan

(57) ABSTRACT

A fastener nut is formed with anti-cross threading features that include a rounded or chamfered edge at the entry end to the nut, followed by an unthreaded cylindrical counterbore that extends axially from the entry end to the threaded section of the bore. The rounded or chamfered entry end prevents cross threading and the unthreaded section is of sufficient length to ensure substantially collinear alignment between the threaded fastener and the correspondingly threaded nut before threaded engagement occurs. An optional radiused portion is formed between the unthreaded and threaded sections of the nut to further prevent cross threading. The nut can be a weld nut formed with weld protrusions which enable the nut to be welded to a large structural member before mating engagement with a threaded fastener occurs. The nut can additionally have convex or concave or other tactile feed back features that induce vibration when a large off-angle is being attempted.

20 Claims, 5 Drawing Sheets

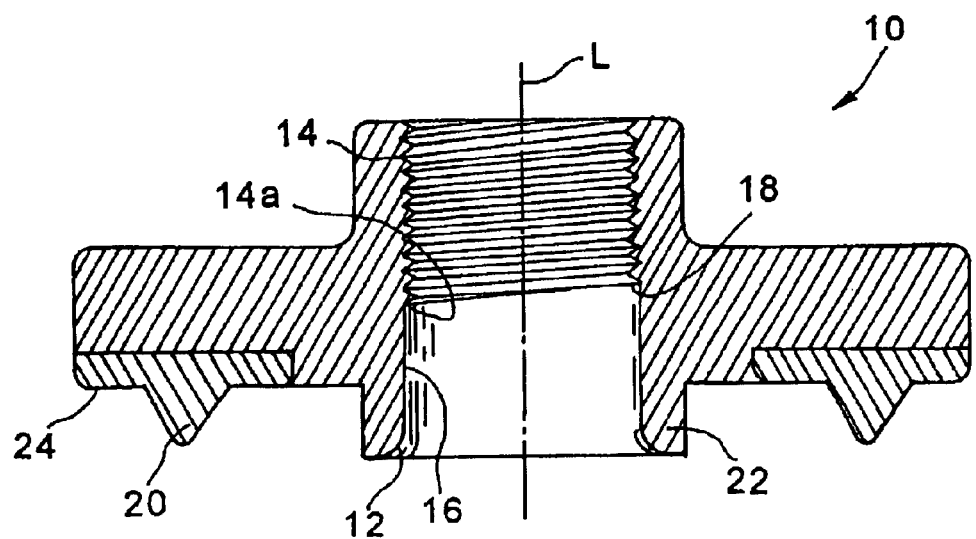
Fig. 1
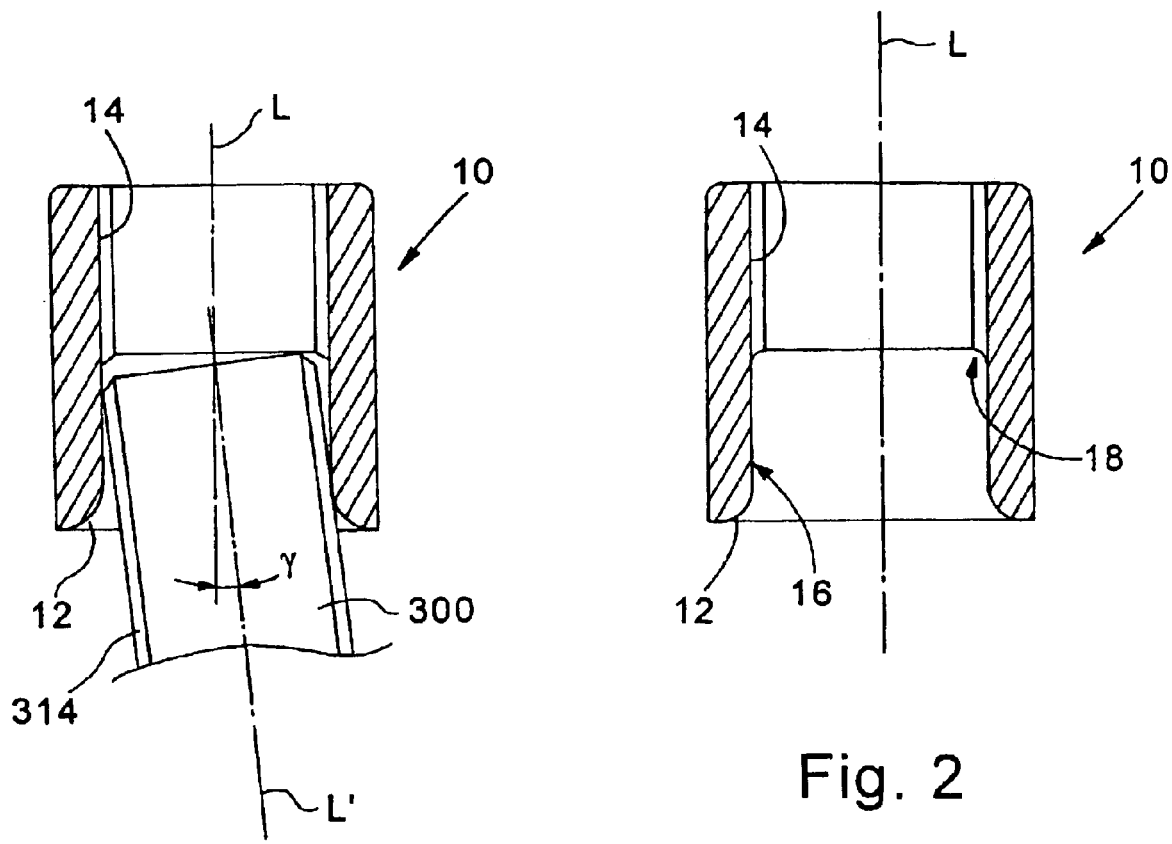
Fig. 3
Fig. 2

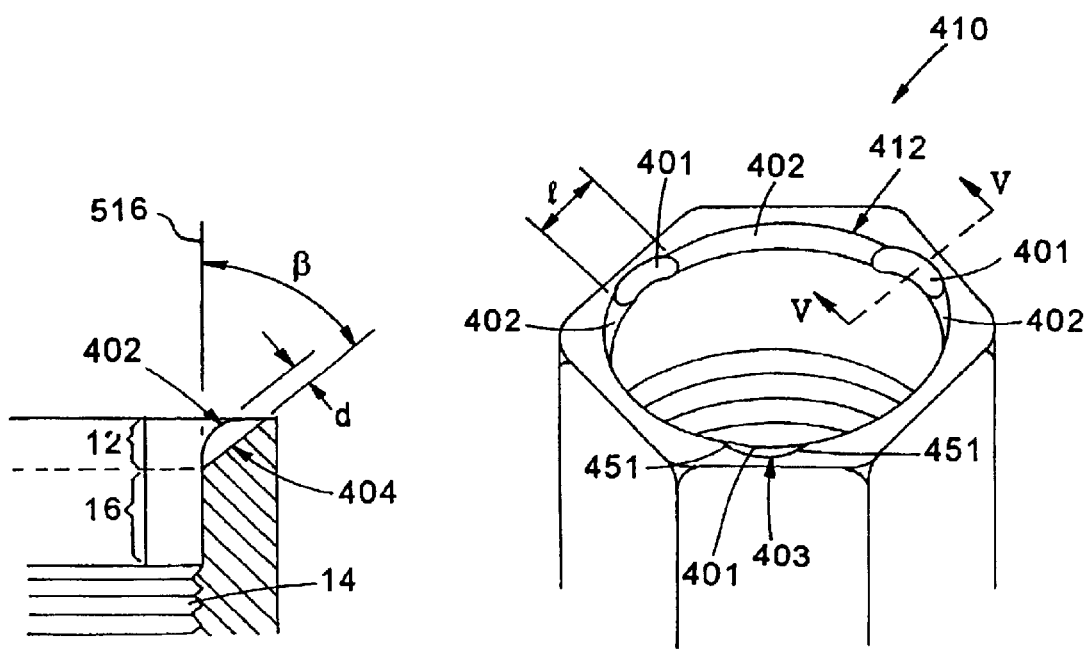
Fig. 5
Fig. 4
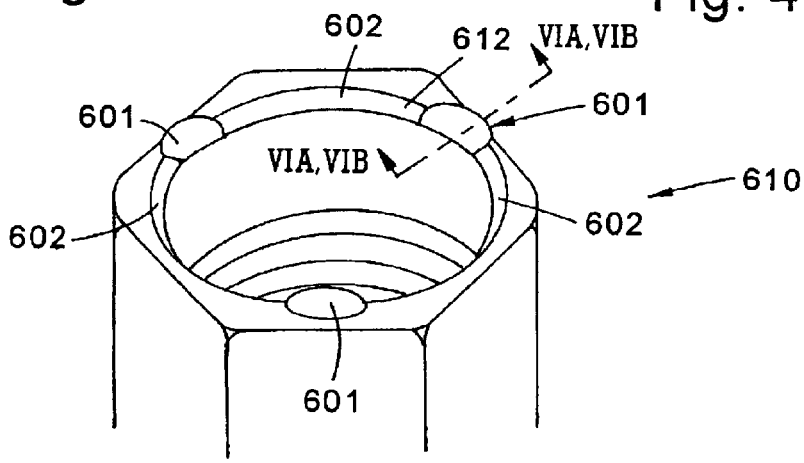
Fig. 6
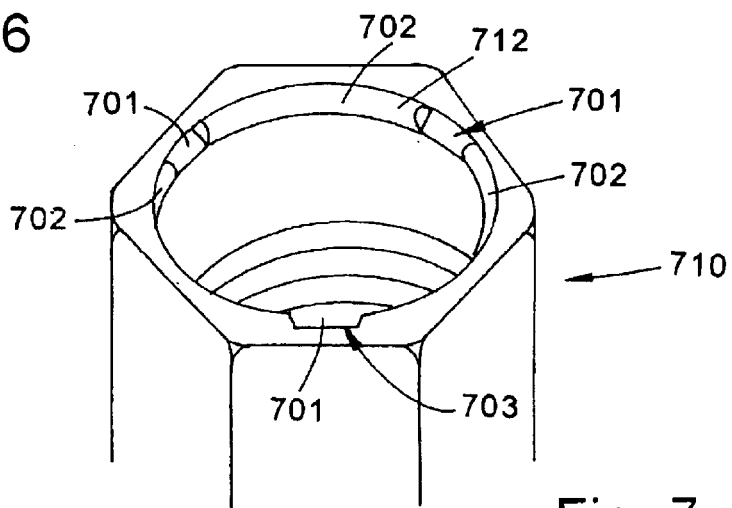
Fig. 7

THREADED FASTENER NUT WITH ANTI-CROSS THREADING RADIUSED FEATURES AND TACTILE FEEDBACK FEATURES

CROSS-REFERENCE TO OTHER APPLICATIONS

This application is a continuation in part of U.S. patent application Ser. No. 09/967,159 filed Sep. 28, 2001 now U.S. Pat. No. 6,702,536, which is incorporated herein by reference in its entirety.

TECHNICAL FIELD

The present invention relates generally to threaded fasteners such as screws, bolts and nuts and, more particularly, to anti-cross threading fasteners.

BACKGROUND OF THE INVENTION

Threaded fasteners are used in the construction or fabrication of most articles of manufacture such as machines, automobiles, trains, planes, engines, etc., and such threaded fasteners may take the form of bolts, screws, studs, rods (all of these terms being used interchangeably herein) or other substantially round members having uniform, non-uniform or tapered external helical threads that are threadedly engaged into mating threaded fasteners such as nuts, bolts or holes having substantially matching internal helical threads. To ensure proper engagement between externally and internally threaded fasteners, it is important that the longitudinal axes of these parts are in substantially collinear alignment before threaded engagement occurs in order to prevent the occurrence of cross threading.

Cross threading generally occurs when there is a misalignment between the externally threaded member, typically a screw or bolt, and the internally threaded member, typically a nut or other threaded hole. Specifically, cross threading is the result of the threads of the two members attempting to engage each other when out of alignment. When this occurs, the two members are not collinear with each other and wedging of the threads will occur as the threaded helixes are rotated against each other. If the rotation continues, as is often the case, the threads on one or both members will become structurally damaged.

While the problem of cross threading is significant under any circumstances in terms of engendering costly downtime and disruption in production, the problem of cross threading is compounded in situations where either the threaded stud or nut is first attached, for example by welding, to a large panel-like or other structural member which then facilitates threaded attachment of another part thereto. In other words, it is typical for weld nuts to be welded to such panels or structural members in one production step (e.g. during the manufacture of an automotive vehicle) to provide an internally threaded means for securing another member to the first mentioned member in a subsequent manufacturing step. In this subsequent step, the cross threading problem is particularly significant since it requires the first mentioned structural member to be repaired and recycled for the purpose of reuse at a later time.

SUMMARY OF THE INVENTION

It is an object of the present invention to provide an anti-cross threading nut that prevents cross threading engagement of a correspondingly threaded shank member with an inlet opening of the nut. Preferably, the nut is configured to allow its threads to engage the matching threads of the threaded shank member only if the shank member is introduced into the inlet opening of said nut at an entry angle not greater than an acceptable misalignment angle, e.g., 5°.

It is another object of the present invention to provide an anti-cross threading nut which has not only the anti-cross threading feature but also tactile feedback features that induce noticeable vibrations that alert the operator that he/she is attempting to introduce the shank member into the nut at an off-angle, i.e., an entry angle that is greater than an acceptable misalignment angle, e.g., 5°. Preferably, the tactile feedback features act to provide vibrations without affecting the anti-cross threading feature.

The anti-cross threading feature of the present invention can be used alone or together with the tactile feedback feature.

These and other objects of the present invention are achieved by an anti-cross threading nut comprising a nut body having first and second open ends at opposite sides thereof and a generally cylindrical passage extending between the first and second open ends. A plurality of threads extend over a predetermined axial extent of the passage to define a threaded region. A remaining portion of the passage is unthreaded up to the first end to define an unthreaded counterbore. The first end defines an inlet opening into the passage for receiving a correspondingly threaded shank member. The inlet opening is radiused or chamfered to prevent cross threading engagement of the shank member with the inlet opening. Advantageously, the shank member proceeds through the unthreaded region which forces the shank to become substantially collinearly aligned with the threaded region of the nut before actual threaded contact occurs. In this manner, cross threading is effectively minimized or eliminated.

In a preferred embodiment, the first inlet opening is radiused. Optionally, though preferably, a second lead-in radius is disposed at the intersection between the threaded region and the unthreaded counterbore. This second lead-in radius further minimizes the possibility of cross threading by providing a smooth transition for the threads of the shank member to pass through the unthreaded counterbore into proper threaded engagement with the threaded region.

The length and diameter of the unthreaded counterbore is structured to limit misalignment between the threaded region and the correspondingly threaded shank member to less than about 10°, preferably less than about 7°, and more preferably less than about 5°. As a result of extensive testing, it has been determined that there is a significant reduction in cross threading at less than such angles of misalignment.

According to one aspect of the present invention, the design of the counterbore is controlled by the thread pitch. In a preferred embodiment, the axial extent or depth of the unthreaded counterbore is equal to at least about four times the thread pitch. This tends to force the before mentioned stud member and threaded region of the nut into correct collinear alignment wherein the threads of the stud and nut members will rotationally engage each other to properly fasten as intended.

The first lead-in radius is preferably at least about 1.5 times the pitch of the nut threads. This enables the thread surface of the stud to smoothly pass into the entrance opening of the unthreaded counterbore without binding or cross threading contact therebetween.

The diameter of the counterbore is machined to equal the nominal diameter of the threaded region plus about 10% of the thread pitch in order to ensure sufficiently snug guiding contact which will enable the aforesaid substantially collinear alignment to occur at the time of threaded engagement.

The above mentioned features may be used in any type of nut applications, such as hex nuts, hex flange nuts, or even one or both ends of a rod coupler. In one preferred embodiment of the present invention, however, the above mentioned anti-cross threading features are formed in a weld nut that includes weld protrusions on a side thereof including the first open end. This enables the nut to be welded to a structural member to facilitate subsequent threaded connection of this member to another member by means of a connecting threaded stud. In this type of environment in which the nut is previously securely welded to a larger structural member, the anti-cross threading features of the invention are particularly important since cross threading has more damaging and costly consequences.

In weld nut applications, the first open end is preferably formed on an elongated pilot section containing the unthreaded counterbore so as to axially offset the open end from the weld protrusions in a direction away from the threaded region of the nut. This pilot section advantageously prevents weld spatter from entering the unthreaded counter bore and possibly contaminating the threads.

In this weld nut embodiment, the weld nut is preferably formed with a material that has been hardened during the nut manufacturing process such as by application of heat in a known manner. By hardening the nut material, the nut threads also become hardened to provide added strength. In accordance with another feature of the invention, however, the hardened weld protrusions are selectively annealed to enable the weld protrusions to function properly to obtain appropriate welded contact between the nut and a supporting structural member. It will be appreciated that the feature of selectively annealing the weld protrusions in an otherwise hardened nut may be used with or without the above mentioned anti-cross threading features.

Accordingly, in accordance with a different aspect of the invention, there is provided a weld nut comprising a nut body formed with at least one weld protrusion, and wherein the nut body includes hardened material and the weld protrusion is an annealed portion. According to this aspect of the invention, the entire nut body, including the weld protrusion, is preferably formed from the same hardened material and the weld protrusions are then selectively annealed to form the annealed portion.

A method of correcting misalignment between a stud and a nut of a threaded fastener assembly is also disclosed. In accordance with this aspect of the invention, the method comprises relatively inserting a threaded end of a stud into a radiused or chamfered entrance opening of a pilot member disposed forwardly adjacent the nut. If there is misalignment, the stud threads contacting the radius or chamfered opening will not cross thread therewith. The threaded end of the stud is then relatively axially advanced through the pilot member which is not correspondingly threaded in relation to the stud thread. This relative axial advancement occurs over a predetermined axial distance that forces the stud axis to enter into substantially collinear alignment with the thread axis of the nut before the stud thread affects threaded contact with the nut thread. Relative rotation between the nut and stud will subsequently cause proper threaded engagement to occur without cross threading.

The above-mentioned and other objects of the present invention are also achieved by an anti-cross threading nut, comprising a nut body having first and second open ends at opposite sides thereof and a passage extending between the first and second open ends, and a plurality of threads extending over a predetermined axial extent of the passage to define a threaded region, a remaining portion of the passage being unthreaded up to the first end to define an unthreaded counterbore. The first end defines an inlet opening into the unthreaded counterbore for receiving a correspondingly threaded shank member. The inlet opening includes cross threading engagement preventing means for preventing cross threading engagement of the shank member with the inlet opening when the shank member is inserted in the inlet opening at an off-angle greater than an acceptable misalignment angle, and tactile feedback providing means for causing the nut member to vibrate when the nut member is driven onto the shank member at an off-angle.

The above-mentioned and other objects of the present invention are also achieved by an anti-cross threading nut, comprising a nut body having first and second open ends at opposite sides thereof and a passage extending between the first and second open ends, and a plurality of threads extending over a predetermined axial extent of the passage to define a threaded region, a remaining portion of the passage being unthreaded up to the first end to define an unthreaded counterbore. The first end defines an inlet opening into the unthreaded counterbore for receiving a correspondingly threaded shank member. The inlet opening including alternating peaks and valleys, wherein either the peaks or the valleys are radiused and define a lead in radius to prevent cross threading engagement of the shank member with the inlet opening. The radiused peaks or valleys function as the anti-cross threading feature, while the others function as the tactile feedback features.

In accordance with the present invention, the tactile feedback features may or may not extend into the counterbore. The tactile feedback features may be concave (valleys) or convex (peaks). The tactile feedback features may be rounded or square or rectangular.

Other and further objects, features and advantages will become apparent from the following description of the presently preferred embodiment of the invention.

BRIEF DESCRIPTION OF THE DRAWINGS

The present invention is illustrated by way of example, and not by limitation, in the figures of the accompanying drawings, wherein elements having the same reference numeral designations represent like elements throughout, and wherein:

FIG. 1 is a schematic cross sectional elevational view of an anti-cross threading nut in accordance with a first embodiment of the present invention;

FIG. 2 is a schematic cross sectional elevational view of an anti-cross threading nut in accordance with a second embodiment of the present invention with an internal lead in radiused portion;

FIG. 3 is a schematic cross sectional elevational view showing an acceptable level of misalignment between the nut of the present invention and a correspondingly threaded shank member;

FIG. 4 is a perspective view of an anti-cross threading nut in accordance with a third embodiment of the present invention with concave tactile feedback features;

FIG. 6 is a perspective view of an anti-cross threading nut in accordance with a fourth embodiment of the present invention with convex tactile feedback features.

FIG. 7 is a perspective view of an anti-cross threading nut in accordance with a fifth embodiment of the present invention with rectangular tactile feedback features;

DETAILED DESCRIPTION OF THE INVENTION

Figure 5A:
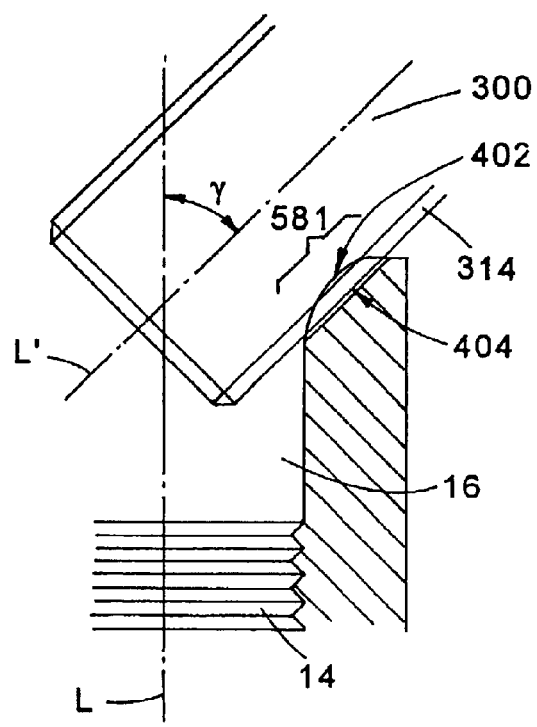
FIG. 5 is a fragmental, cross sectional view taken along line V—V in FIG. 4, FIGS. 5A and 5B are views similar to FIG. 5 showing a bolt being introduced into the nut of the present invention at various entry angles.

Before the embodiments of the invention are explained in detail, it is to be understood that the invention is not limited in its application to the details of construction and the arrangements of components set forth in the following description or illustrated in the drawing. The invention is capable of other embodiments and of being practiced or being carried out in various ways. Also, it is understood that the phraseology and terminology used herein are for the purpose of description and should not be regarded as limiting. The use of letters to identify steps of a method or process is simply for identification and is not meant to indicate that the steps should be performed in a particular order.

Anti-cross Threading Feature

FIG. 1 is an illustration of an anti-cross threading nut 10 having novel and unique anti-cross threading and self alignment features constructed in accordance with the principles of the present invention. In the threaded fastener environment in which one embodiment of the invention is intended to be used, when the opposing thread helixes address each other, there is a natural tendency to collinearly align their respective mating planes during rotation. However, if the initial misalignment between the longitudinal axis of an external threaded fastener and the internal threads of the corresponding nut is significant, then this misalignment will disadvantageously cause the threads to engage each other in a structurally deforming manner that causes undesirable cross threading to occur and which prevents proper threaded engagement between the fastener parts.

To eliminate cross threading, a nut 10 according to one aspect of the present invention is formed with a radiused or chamfered inlet or entrance opening 12 through which the external thread (e.g., 314 shown in FIG. 3) of the stud or first member (e.g., 300 shown in FIG. 3) initially enters the nut. If there is misalignment between axis L' of the first member 300 and nut axis L, there will be a tendency for the external fastening threads 314 to contact the edges defining the entrance opening 12. If these edges are sharp, the external threads 314 could deformably engage with the entrance opening 12 and such engagement could cause structural damage to one or both of the opening 12 and the external threads. To minimize this type of cross threading, the edge surfaces defining the entrance opening 12 to the nut threads 14 are preferably radiused to present a smooth rounded surface that will be resistant to such undesirable binding or cross threading contact with the leading and subsequent threads of the external threaded fastener. Preferably, the radius is at least 1.5 times the pitch of the external or nut thread 14. FIG. 3 shows an acceptable level of misalignment (i.e., entry angle γ (FIG. 3) is less than 10°, preferably less than 7°, and more preferably less than 5°) between the nut of the present invention and a correspondingly threaded stud 300 having an axis L'.

It may be possible to form the entrance or inlet opening 12 with a chamfered surface (not shown in detail) instead of a radiused surface so long as the transitional angles between the respective surfaces defining the chamfer do not give rise to binding contact.

According to another aspect of the present invention, the nut 10 includes an unthreaded counterbore 16 extending a predetermined axial distance between the entrance end 12 of the nut and the leading axial nut thread 14a. The purpose of the unthreaded counterbore 16 is to gently but firmly force the threaded fastener into substantially collinear alignment with the nut thread axis L before threaded engagement actually occurs. As a result of experimentation, it has been discovered that the axial length (or depth) of the unthreaded counterbore 16 should preferably be at least four (4) times the pitch of the nut thread 14 and that the diameter of the unthreaded counterbore be equal to at least the nominal diameter of the nut thread plus about 10% of the thread pitch. In this manner, at the time of actual threaded engagement, the external threaded fastener is aligned with the nut thread axis L to an acceptable level (e.g. 10°, preferably 5°, or less) so that cross threading will not occur once threaded engagement commences. By making the length of the unthreaded counterbore 16 longer, in accordance with the principles of the present invention, it will now be appreciated that even greater alignment can occur between the external threaded fastener and the nut threads 14, thus further reducing the possibility of cross threading. Although the length and diameter of the counterbore 16 has been described in terms of their relationship to the thread pitch, it is understood that the length and diameter of the counterbore 16 can be controlled by other fastener characteristics.

Optionally, though preferably, the intersection between the trailing end of the unthreaded counterbore with the threaded region 14 of the nut 10 is preferably formed with a second lead in radiused portion 18 (FIG. 2) which may have the same curvature characteristics as the first lead in radius opening 12 to provide a continued smooth transition, free of sharp protruding surfaces, that will enable the leading thread of the external threaded fastener to enter into smooth threaded engagement with the leading threads 14a of the internal thread region within the nut. Due to the relative recessed placement of the second lead in or entrance portion 18 relative to the entrance or inlet opening 12, it is also possible to form the second lead in radius with a different curvature. Desirably, this different curvature is at least 0.6 times the thread pitch.

As discussed extensively above, the foregoing features force the external threaded fastener to align within the bore 16 prior to threaded engagement and, once in the bore, tend to limit the entry angle to less than about 10°, preferably less than about 5°, where cross threading is significantly reduced.

The foregoing anti-cross threading features may be utilized in any type of nut fastener as mentioned above. However, these anti-cross threading features will find particular preferential use in nuts 10 that are attached to large structural components before subsequent threaded attachment to another structural component occurs, such as in the manufacture, for example, of automotive and other types of vehicles or large machinery. In this type of environment, it will be particularly appreciated and understood by persons skilled in the art that disadvantageous cross threading between mating threaded fasteners could have highly undesirable consequences. For example, once the nut formed with the cross threading features of the invention is securely fastened to one structural component during an earlier manufacturing step, any subsequent cross threading occurring in a later manufacturing or assembly step will necessitate a disruption in the production cycle and perhaps require either scrapping of the damaged cross threading components or costly repair in order to make reuse possible at a subsequent time. Therefore, in accordance with another aspect of this invention, the anti-cross threading features of the present invention find highly preferred use in weld nuts which are formed with weld protrusions 20 to facilitate welding of the nut to a structural member (not shown but easily accomplished in a manner known to persons skilled in this art). In a weld nut environment, the inlet or entrance opening 12 as well as the leading portion of the unthreaded counterbore 16 is preferably formed in a pilot section 22 that is axially offset from the weld protrusions 20 in a direction facing away from the nut threads 14. With this feature, weld splatter that occurs during the welding process is not likely to enter into the unthreaded counterbore 16 where it might otherwise disadvantageously coat the nut threads 14 and cause cross threading to occur. The axial length of the pilot section 22 from the surface 24 of the weld protrusion 20 preferably is equal to or less than the thickness of the panel material to which the nut 10 is being attached in order to prevent the pilot section from protruding from the opposite side of the panel surface.

It is highly desirable in certain applications to form the weld nut 10 with a hardened material in order to improve thread strength and the extent to which torque may be applied to provide secure fastening engagement. However, since it may be disadvantageous to equally harden the material forming the weld protrusion 20, another preferred feature of this invention is the selective annealment of the weld protrusions so that these protrusions are not as hard as the remaining material of the nut body including the threads 14. While this aspect of the invention is preferably used in combination with the anti-cross threading features disclosed hereinabove, it is also within the scope of this specification to provide a weld nut formed with selectively annealed weld protrusions that do not necessarily include the anti-cross threading features of this invention.

Tactile Feedback Feature

When a nut is fastened to a matching bolt, the incomplete thread(s), i.e., typically the first threads on the bolt or leading threads 14a of nut 10 (FIG. 1) which go from no thread to full diameter in 1 to 3 revolutions, act as a ramp. Also, when the threads of the nut and bolt do not engage immediately, the bolt, usually driven by a powered driving tool, turns one more revolution and tries to catch the threads of the nut again. Both of these mechanisms add to vibration during the installation of the fastener including the nut and the bolt. As a result of extensive testing, it has been determined that at approximately 5° (for header point bolts and standard nuts), this vibration is at its peak. The above-mentioned catching and re-catching of the threads at large off-angles are not only the source of vibration, but also of cross threading.

In anti-cross threading nut 10 of the present invention, the deep, tightly toleranced counterbore 16 reduces or even eliminates possibilities of cross threading. It has been found via extensive testing that if the bolt was driven at less than 5° off axis, the occurrences of cross threading were greatly reduced. In other words, the geometry of counterbore 16 preferably prevents the first threads of nut 10 and matching bolt 300 from engaging, unless bolt 300 is introduced into counterbore 16 at about or less than 5° off axis. Thus, when an off-angle, i.e., an entry angle ($\gamma$, FIG. 3) which is greater than an acceptable misalignment angle (in this case, 5°), is being attempted, counterbore 16 prevents the threads of nut 10 and matching bolt 300 from engaging. Continued forcing the bolt in without changing the entry angle can result in slamming the parts together, or the nut slips off the bolt, depending on the amount of entry angle and end load. Thus, there is a need for a mechanism, or tactile feedback feature, that alerts the operator that an off-angle is being attempted.

Reference is now made to FIG. 4 which is a perspective view of an anti-cross threading nut 410 provided with tactile feedback features 401 in accordance with a third embodiment of the present invention. Inlet opening 412 includes radiused regions or "peaks" 402 that define the first lead in radius as described with respect to the anti-cross threading nut of FIG. 1. Inlet opening 412 further includes tactile feedback features 401 that are concave and create "holes" or "valleys" (best seen as 403, FIG. 4) into which the bolt falls, thereby creating vibrations of an amplitude greater than otherwise observed in an anti-cross threading nut having a smooth inlet opening 12 as shown in FIG. 1. At a large entry angle (or off-angle), which, in this case, is greater than 5°, the vibrations are intensified and become noticeable to the operator who is utilizing a powered driving tool to fasten the bolt with nut 410. The induced vibrations alert the operator of the unacceptably large off-angle. The configuration of valleys 401, e.g., the length of the valleys in the circumferential direction of inlet opening 412, is structured so that, at entry angles less than 5°, the bolt will not or will only slightly engage the holes or valleys, i.e., little vibration indicates on-axis driving.

Figure 5B:
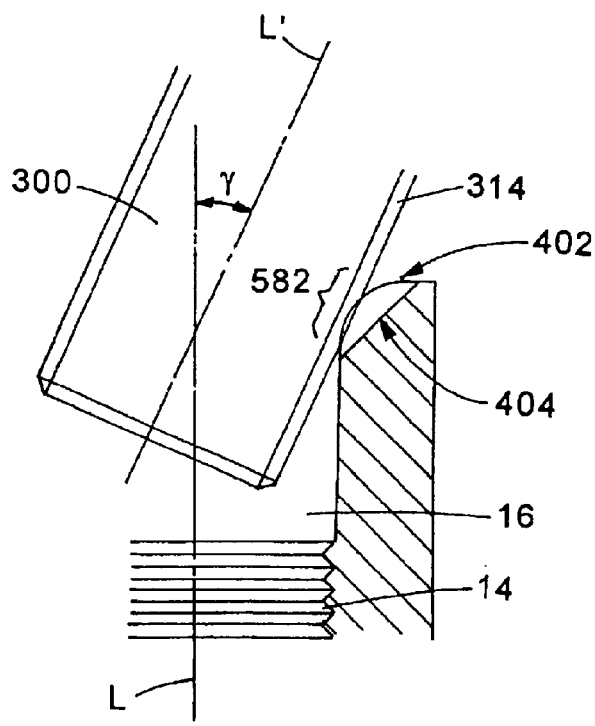

This will be best explained with reference to FIGS. 5A and 5B, which are fragmental, cross sectional views of nut 410 and show a bolt 300 being introduced into nut 410 at various entry angles $\gamma$ defined by axis L of the nut and axis L' of the bolt. In FIG. 5A, when bolt 300 is introduced at an excessive entry angle (or off-angle), a portion (generally designated at 581) of threads 314 of bolt 300 falls into one of holes or valleys 401. When nut body 410 is driven by a power driving tool, the bolt 300 repeatedly strikes walls 451 (FIG. 4) of valleys 401, causing the nut body 410 to strongly vibrate. The operator feels the vibrations and attempts to reduce the entry angle as shown in FIG. 5B. Although the nut body 410 has been described as being driven onto bolt 300, it is envisioned that the bolt 300 can be driven into the nut body 410 in accordance with the principles of the present invention. In FIG. 5B, a portion (generally designated at 582) of threads 314 of bolt 300 might still fall into one of holes or valleys 401. However, thread portion 582 in FIG. 5B is smaller than thread portion 581 in FIG. 5A, and therefore, vibrations induced in the situation of FIG. 5B is not as strong as the vibrations induced in the situation of FIG. 5A. If the operator continues to reduce the entry angle $\gamma$, threads 314 of bolt 300 will eventually be allowed to engage with inner threads 14 of nut 410, completing the fastening process without the risk of cross threading.

For an M8 size nut, length l of each valley 401 is about 5.5 mm. Depth d (FIG. 5) of valley 401 is at least 0.25 mm. As can be seen in FIG. 5, the tactile feedback features or valleys 401 do not extend into counterbore 16, an imaginary cylindrical extension 516 of which creates with bottom 404 of tactile feedback features 401 an angle $\beta$. However, it is within the scope of the present invention to provide an anti-cross threading nut having tactile feedback features extending into counterbore 16 which is a generally cylindrical bore. The tactile feedback features should not extend too deep into counterbore 16 because, otherwise, some protection against cross threading may be lost.

In addition, FIG. 5 shows valleys 401 having a conical bottom surface at 404. Preferably, the entireties of all valleys 401 are machined, forged or otherwise formed to reside in a single surface. Angle β then presents the angle of the surface, which is preferably from about 20 degrees to about 70 degrees. Other methods may be used to manufacture nut 410. It is also within the scope of the present invention to provide valleys 401 with planar (703, FIG. 7) bottom surfaces and other shaped surfaces.

Figure 6B:
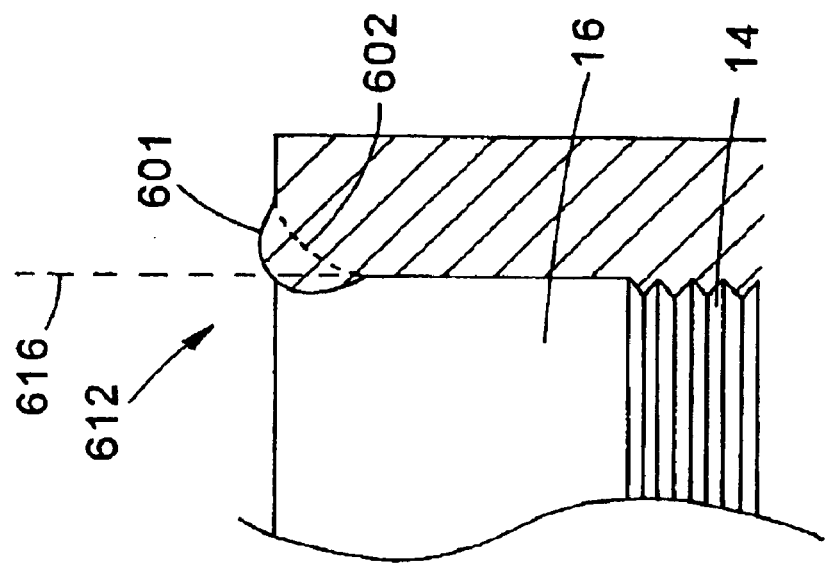
FIGS. 6A–6B show fragmental, cross sectional views taken along line VI—VI in FIG. 6 in accordance with various aspects of the present invention.
Figure 6A:
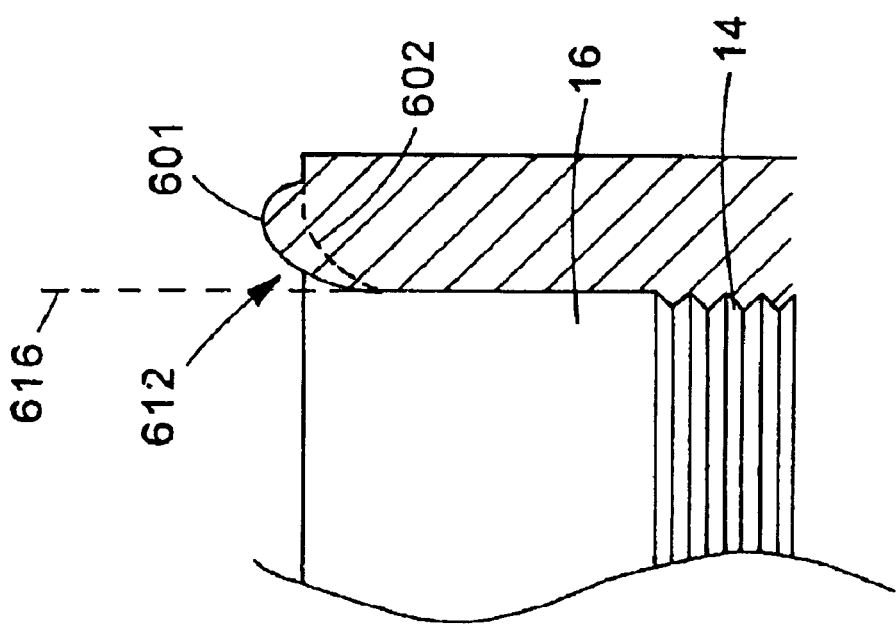

FIG. 6 shows a fourth embodiment of the present invention which is a "reverse" version of FIG. 4. In particular, FIG. 6 is a perspective view of an anti-cross threading nut 610 provided with tactile feedback features 601. Inlet opening 612 includes radiused regions or "valleys" 602 that define the first lead in radius as described with respect to the anti-cross threading nut of FIG. 1. Inlet opening 612 further includes tactile feedback features 601 that are convex and create raised bumps or "peaks." The embodiment depicted in FIG. 6 functions generally in a similar manner to FIG. 4. As can be seen in FIG. 6, bumps or peaks 601 preferably have rounded, or otherwise curved, external surfaces to avoid cross threading engagement of a bolt, such as bolt 300, with inlet opening 612 of nut 610. FIGS. 6A and 6B show possible configurations of bumps 601 which may (FIG. 6B) or may not (FIG. 6A) project through imaginary (e.g., cylindrical) extension 616 of counterbore 16. However, in the embodiment shown in FIG. 6B, bumps 601 should not obstruct entry of a bolt into inlet opening 612 of nut 610.

FIG. 7 is a perspective view of an anti-cross threading nut 710 provided with tactile feedback features 701 in accordance with a fifth embodiment of the present invention. Like FIG. 4, inlet opening 412 includes radiused regions or "peaks" 702 that define the first lead in radius as described with respect to the anti-cross threading nut of FIG. 1, and further includes tactile feedback features 701 that are concave and create "holes" or "valleys." However, valleys 701 have square or rectangular (rather than rounded or curved as illustrated in FIG. 4) bottoms 703 which may be planar.

Figure 10:
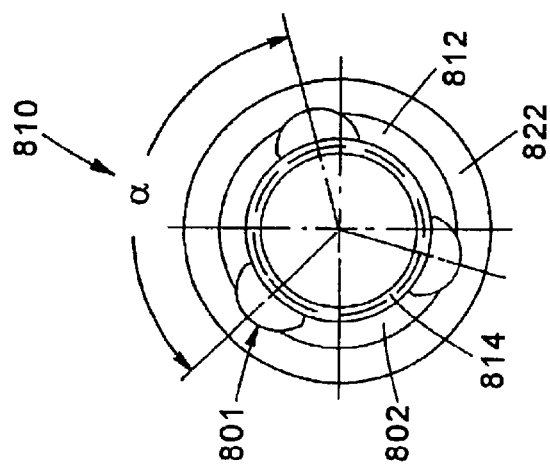
FIG. 10 is a bottom view of the anti-cross threading nut of FIG. 8.
Figure 9:
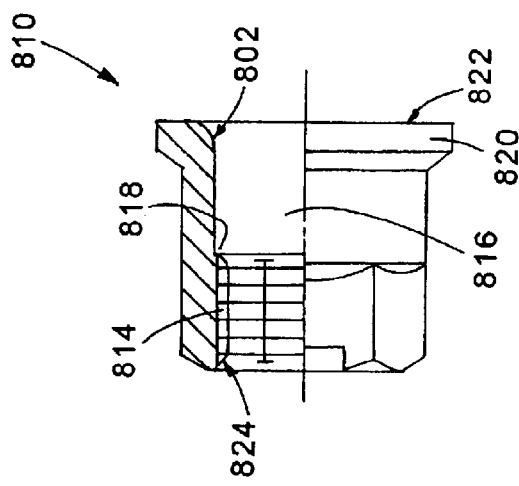
FIG. 9 is a cross sectional view taken along line IX—IX in FIG. 8.
Figure 8:
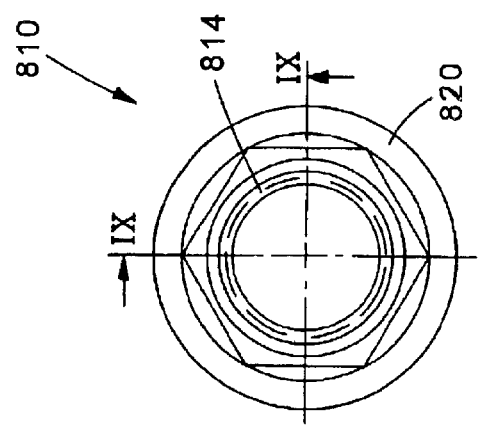
FIG. 8 is a top view of an anti-cross threading nut in accordance with a sixth embodiment of the present invention.

FIGS. 8–10 depict an anti-cross threading nut 810 of a particularly preferred embodiment (sixth embodiment) of the present invention which is similar to the third embodiment of FIG. 4. The top view in FIG. 8 shows nut 810 having flange 820 and internal threads 814. Threads 814 extend only for a part of the internal passage of nut 810, leaving the remainder of the passage unthreaded as illustrated in FIG. 9 at 816. The intersection between threads 814 and counterbore 816 may or may not include a second lead in radius 818 similar to element 18 of FIG. 1. Threads 814 have an end 824 chamfered at 45°. Flange 820 has a planar top surface designated at 822. As can be seen from the bottom view in FIG. 10, inlet opening 812 of nut 810 has radiused regions or "peaks" 802 that define the first lead in radius as described with respect to the anti-cross threading nut of FIG. 1, and further includes tactile feedback features 801 that are concave and create "holes" or "valleys." The peaks and valleys are alternatingly arranged in the circumferential direction of inlet opening 812. Valleys 801 are spaced regularly angularly from each other, i.e., by α=120° as shown in FIG. 10. Each valley or tactile feedback feature 801 does not extend into generally cylindrical counterbore 816. Nut 810 functions in the same manner as nut 410, i.e., valleys 801 and peaks 802 create noticeable vibration at large off-angles, and much less vibration at entry angles of about or less than a predetermined acceptable misalignment angle. The larger the off-angle, the larger the vibrations induced by the tactile feedback features of the present invention.

This is another important aspect of the present invention. When the nut is introduced over the bolt at a greater than acceptable entry angle, vibrations are induced in the system and provide tactile feedback to the operator that he/she is attempting to fasten the nut to the bolt at an off-angle, and that the operator needs to correct the entry angle. If the operator corrects the entry angle in the wrong direction, i.e., he/she makes the entry angle larger, vibrations will become stronger. When the operator feels the stronger vibrations he/she will know the entry angle should be corrected in the opposite direction in order to fasten the parts.

The anti-cross threading feature of FIG. 1 can be used with or without the tactile feedback features of FIGS. 4–10. The nut can be a weld nut (FIG. 1). The anti-cross threading feature functions when either of the nut or the bolt rotates. However, the tactile feedback feature functions best when the nut is driven by a powered driving tool to rotate. The operator may not feel tactile feedback if he or she uses a traditional nut-runner.

Variations and modifications of the foregoing are within the scope of the present invention. It is understood that the invention disclosed and defined herein extends to all alternative combinations of two or more of the individual features mentioned or evident from the text and/or drawing. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. An anti-cross threading nut, comprising:
a nut body having first and second open ends at opposite sides thereof and a passage extending between said first and second open ends; and
a plurality of threads extending over a predetermined axial extent of said passage to define a threaded region, a remaining portion of said passage being unthreaded up to said first end to define an unthreaded counterbore, said first end defining a smooth inlet opening into said unthreaded counterbore for receiving a correspondingly threaded shank member, said inlet opening including cross threading engagement preventing means for preventing cross threading engagement of said shank member with said inlet opening when said shank member is positioned in said inlet opening at an off-angle greater than an acceptable misalignment angle, and tactile feedback providing means for causing one of said nut body and said shank member to vibrate when said shank member engages said tactile feedback providing means as said nut body and said shank member are caused to be connected by we of a power tool when said shank member is positioned in said inlet opening at said off-angle.

2. The anti-cross threading nut of claim 1, wherein said unthreaded counterbore has a depth and a diameter that prevent the threads of said nut from engaging matching threads of said shank member when said shank member is positioned in said inlet opening at said off-angle.

3. The anti-cross threading nut of claim 1, comprising said tactile feedback providing means for causing one of said nut body and said shank member to vibrate with progressively larger vibrations when said nut body is connected to said shank member by a power tool when said shank member is positioned into said inlet opening at progressively larger said off-angles.

4. The anti-cross threading nut of claim 1, wherein said tactile feedback providing means couse said nut body to vibrate when said nut body is driven by a power tool over said shank member.

5. An anti-cross threading nut, comprising:
   a nut body having first and second open ends at opposite sides thereof and a passage extending between said first and second open ends; and
   a plurality of threads extending over a predetermined axial extent of said passage to define a threaded region, a remaining portion of said passage being unthreaded up to said first end to define an unthreaded counterbore;
   wherein said first end defines a smooth inlet opening into said unthreaded counterbore for receiving a correspondingly threaded shank member, said inlet opening including alternating peaks and valley; and either said peaks or maid valleys are radiused and define a lead in radius to prevent cross threading engagement of said shank member with said inlet opening, and the others of said peaks or valleys being configured and adapted to cause one of said nut body and said shank member to vibrate upon engagement with said shank member when said nut body and said shank member are caused to be rotatably connected together.

6. The anti-cross threading nut of claim 5, wherein an axial extent of the unthreaded counterbore is structured to prevent the threads of said nut from engaging matching threads of said shank member when said shank member is inserted in said inlet opening at an entry angle greater than 5°.

7. The anti-cross threading nut of claim 5, wherein the others of said peaks and valleys do not extend into the unthreaded counterbore.

8. The anti-cross threading nut of claim 5, wherein the others of said peaks and said valleys extend into the unthreaded counterbore.

9. The anti-cross threading nut of claim 5, wherein said peaks define said lead in radius, and each of said valleys includes a cylindrical or conical surface.

10. The anti-cross threading nut of claim 5, wherein said peaks define said lead in radius, and each of said valleys includes a planar surface.

11. The anti-cross threading nut of claim 5, wherein said peaks define said lead in radius, and each of said valleys includes a bottom of a generally rectangular shape.

12. The anti-cross threading nut of claim 5, wherein said valleys define said lead in radius, and said peaks include raised bumps.

13. The anti-cross threading nut of claim 12, wherein said raised bumps have curved and smooth external surfaces to prevent cross threading engagement of said shank member with said bumps.

14. The and-cross threading nut of claim 12, wherein said unthreaded counterbore includes an inner cylindrical surface that is smooth over an entire axial extent thereof from the inlet opening to the intersection between the threaded region and the unthreaded counterbore.

15. An anti-cross threading nut, comprising:
    a nut body having first and second open ends at opposite sides thereof and a passage extending between said first and second open ends, and a plurality of threads extending over a predetermined axial extent of said passage to define a threaded region, a remaining portion of said passage being unthreaded up to said first end to define an unthreaded counterbore, said first end defining an inlet opening into said unthreaded counterbore for receiving a correspondingly threaded shank member, said inlet opening includes a smooth, generally angled lead in surface leading into said unthreaded counterbore to prevent cross threading engagement of said shank member with said inlet opening when said shank member is positioned in said inlet opening at an off-angle greater than an acceptable misalignment angle, and said inlet opening being further includes tactile feedback features causing one of said nut body and said shank member to vibrate upon engagement with said shank member when said nut body and said shank member are caused to be rotatably connected together when said shank member is positioned in said inlet opening at said off-angle.

16. The anti-cross threading nut of claim 15, wherein said smooth lead in surface of said inlet opening is radiused to define a first lead in radius.

17. The anti-cross threading nut of claim 16, wherein said tactile feedback features of said inlet opening include at least one inwardly extending surface with respect to said smooth lead in surface.

18. The anti-cross threading nut of claim 16, wherein said tactile feedback features of said inlet opening include at least one outwardly extending surface with respect to said smooth lead in surface.

19. The anti-cross threading nut of claim 15, wherein said inlet opening includes alternating peaks and valleys, such that either said peaks or said valleys define said smooth lead in surface and the others of said peaks or said valleys define said tactile feedback features.

20. The anti-cross threading nut of claim 19, wherein said tactile feedback features are configured and arranged such that when said shank member is inserted in said inlet opening at an entry angle that is less than about 5°, said shank member will not appreciably engage said tactile feedback features thereby providing little, if any, vibration, and such that when said shank member is inserted in said inlet opening at an entry angle that is greater than about 5°, said shank member will appreciably engage said tactile feedback features so as to provide significant vibration.

* * * * *